United States Patent

[11] 3,591,947

| [72] | Inventor | Robert W. Sexton<br>Louisville, Ky. |
|---|---|---|
| [21] | Appl. No. | 722,695 |
| [22] | Filed | Apr. 19, 1968 |
| [45] | Patented | July 13, 1971 |
| [73] | Assignee | American Air Filter Company, Inc.<br>Louisville, Ky. |

[54] LIQUID BATH GAS-CLEANING APPARATUS
4 Claims, 6 Drawing Figs.

[52] U.S. Cl. .................................................. 55/224,
261/114, 55/225, 55/259, 55/226
[51] Int. Cl. .................................................... B01f 3/04
[50] Field of Search ........................................ 55/224,
225, 226, 259, 233; 261/114 VT

[56] References Cited
UNITED STATES PATENTS

| 2,718,901 | 9/1955 | Nutter | 261/114 (VT) |
| 2,846,204 | 8/1958 | Gilmore | 261/114 (VT) |
| 2,889,004 | 6/1959 | Nutting et al. | 55/225 |
| 2,966,958 | 1/1961 | Sexton | 55/224 |
| 3,397,513 | 8/1968 | Ephraim, Jr. et al. | 55/233 X |
| 3,434,700 | 3/1969 | Sexton et al. | 261/109 |
| 3,491,987 | 1/1970 | Eckert | 261/114 (VT) |

*Primary Examiner*—Tim R. Miles
*Attorney*—Ralph B. Brick

ABSTRACT: An improved liquid bath gas-cleaning apparatus including a gas-liquid contact tray having pivotally mounted slats arranged to pivot from a horizontal position transverse the gas flow path during low-volume gas flow operations to a vertical parallel position relative the gas flow path during high-volume gas flow operations.

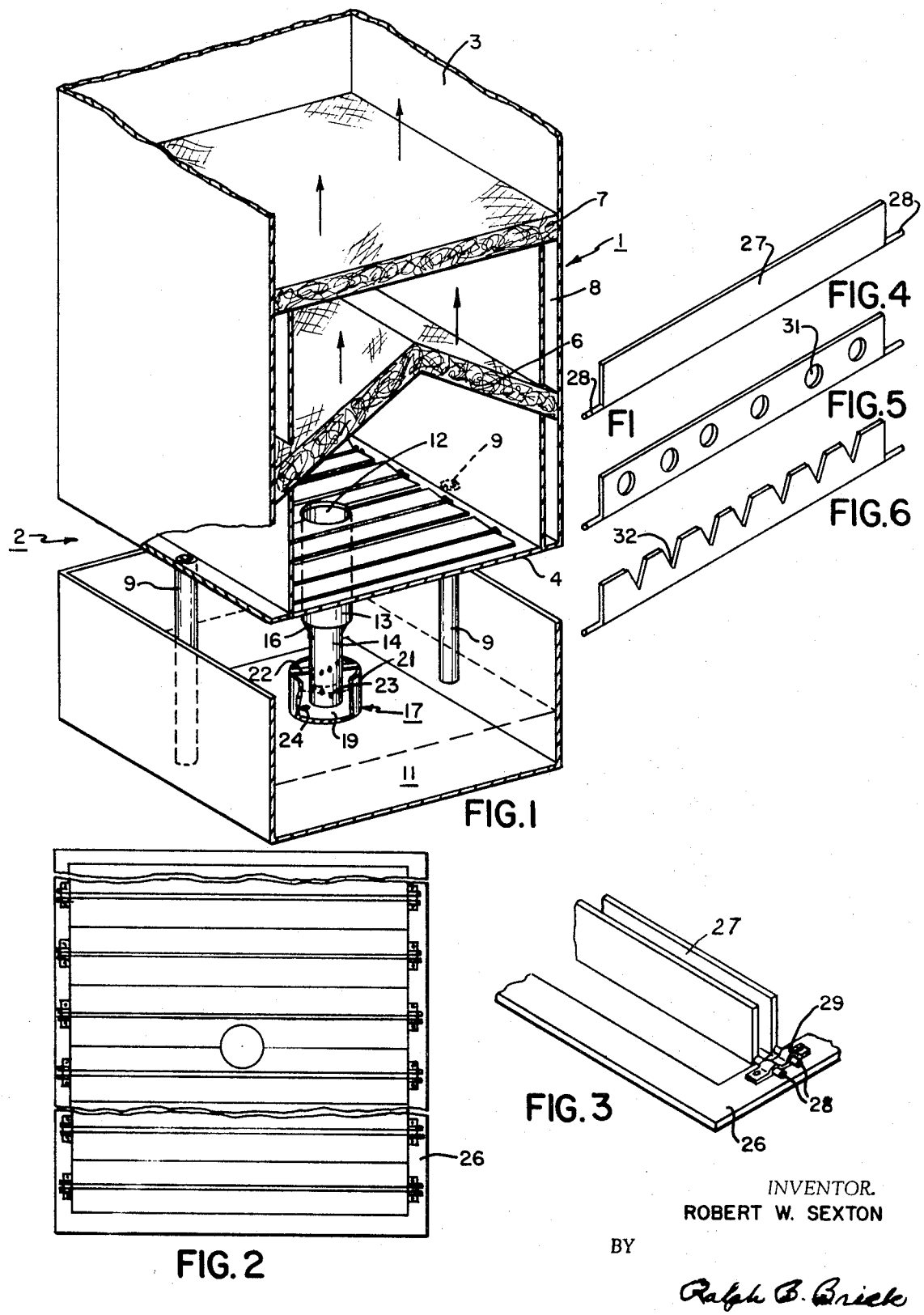

3,591,947

LIQUID BATH GAS-CLEANING APPARATUS

BACKGROUND OF THE INVENTION

The present invention pertains to fluid filtration and finds particularly utility in the gas separation art wherein particulate materials are separated from a gaseous stream by utilization of gas-liquid contact.

Various types of gas-liquid contact apparatus are known in the art of gas filtration, such apparatus employing gas-liquid contact trays upstream the filtering section of the gas-cleaning operation. To control the amount of gas through the system and to provide the desirable gas-liquid contact, various valve arrangements have been employed in the past to cooperate with apertures in the gas-liquid contact trays. These past arrangements have been limited in their scope of operations, often providing the desired gas-liquid contact during low-volume gas flow operations, but presenting substantial gas flow resistance during high-volume gas flow operations. In addition, these past arrangements have been complex, expensive, and time consuming in construction, installations, and operation. Moreover, because of inherent physical properties which have contributed to gas flow resistance, these past arrangements have necessarily required further expensive equipment to compensate for such physical properties.

SUMMARY OF THE INVENTION

In accordance with the present invention, a new, useful and unobvious gas-liquid contact apparatus is provided which affords efficient operation over a broad range of gas volume conditions, assuring appropriate gas-liquid contact at both low- and high-volume gas flows without the incurrence during high-volume operations of concomitant problems of resistance which have occurred in that past. In addition, the present invention provides a gas-liquid contact apparatus which permits effective use of gas-treating devices which utilize the gas flow to supply liquid to the separating chamber, while at the same time exerting a relatively low resistance to gas flow. Further, the present invention lends itself to ready and economical fabrication, construction, and maintenance, utilizing a minimum amount of materials and storage space and requiring a minimum of time for installation.

Various other features of the present invention will become obvious to one skilled in the art upon reading the disclosure set forth hereinafter.

More particularly, the present invention provides a gas-scrubbing apparatus comprising: a flow-through gas housing having a dirty gas inlet means and a clean gas outlet means, the housing defining the gas flow path for the total flow of gas to be treated; gas filter means disposed in the housing transverse the gas flow path; a gas-liquid contact tray disposed in the housing below the gas filter means and transverse the gas flow path, the gas-liquid contact tray including a plurality of side-by-side longitudinally extending slats pivotally mounted in the housing to pivot from a substantially horizontal position transverse the gas flow path during low-volume gas flow operations to a substantially vertical position parallel the gas flow path during high-volume gas flow operations; a liquid sump containing a supply of liquid to be conveyed to the housing; and means to move the liquid from the sump to the gas-liquid contact tray during gas flow operations.

It is to be understood that various changes can be made in the arrangement, form, and construction of the apparatus disclosed herein without departing from the scope or spirit of the present invention.

Referring to the drawing which discloses one advantageous embodiment of the present invention and several modifications of the slats thereof:

FIG. 1 is an elevational, partially broken away isometric view of a gas-cleaning apparatus incorporating the novel gas-liquid contacting arrangement of the present invention;

FIG. 2 is a slightly enlarged plan view of the gas-liquid contact tray utilized in the apparatus of FIG. 1;

FIG. 3 is an enlarged isometric view of a portion of the gas-liquid contact tray of FIG. 2;

FIG. 4 is an isometric view of one of the slats of FIGS. 2 and 3;

FIG. 5 is an isometric view of a modified version of a slat which can be utilized in the present invention; and FIG. 6 is an isometric view of still another modified version of a slat which can be utilized in the present invention.

As disclosed in FIG. 1 of the drawing, the apparatus of the present invention can be utilized in combination with a gas-cleaning assembly which includes flow-through gas housing 1 having dirty-gas inlet 2 and downstream clean-gas outlet 3. Disposed to extend in horizontal fashion across the interior of gas-cleaning housing 1 is gas-liquid contact tray assembly 4 which incorporates the novel gas-liquid contacting apparatus of the present invention. Positioned in spaced relationship downstream of gas-liquid contact tray 4 are two filters 6 and 7. Both filters are disclosed being adapted to drain alongside drain channels 8, the conduits 9 extending into liquid sump 11. As can be seen in FIG. 1 of the drawing, gas-liquid contact tray 4 is provided with a centrally disposed aperture 12 with which one end of liquid lift conduit 13 communicates. It is to be understood that any one of a number of suitable liquid-lifting devices can be used, as is known in the art, to introduce liquid through conduit 13 onto the upper surface of gas-liquid contact tray 4. Advantageously, a device is utilized wherein liquid is lifted to the tray be means of the gas flow itself. This device, which is similar to that set forth in FIG. 8 of assignee's U.S. Pat. No. 2,966,958, issued to Robert W. Sexton on Jan. 3, 1961, includes conduit 14 of substantially smaller cross-sectional area than the cross-sectional area of housing 1. Conduit 14 is diametrically smaller than conduit 13 and is axially aligned and connected to one end of conduit 13 by straps 16. The other end of conduit 14 extends into an upwardly open supplementary reservoir generally designated 17 disposed in sump 11. Reservoir 17 has a bottom 19 and a circumferential wall 21, the circumferential wall being secured by angles 22 or in any other suitable manner to conduit 14 to form an annular wall space around the lower portion of the reservoir. Conduit 14 is provided with spaced metering holes 23 which extend downwardly to the bottom wall of reservoir 17. An orifice 24 of predetermined size is provided in the bottom wall of reservoir 17 to serve as an inlet to the reservoir from sump 11. Oil from the sump must flow through the orifice and thence through one of the lower metering holes 23 to enter the conduit. By means of this arrangement, the rate of oil flow into the reservoir is controlled with a given size orifice and is dependent upon the level of oil in the sump. A relatively higher level results in a relatively greater head of oil at the orifice and vice versa. The oil flowing into the reservoir enters the conduit 14 through the lower holes and is broken-up and entrained in conduit 14 by a minor part of the minor portion of the gas stream to be treated and carried along conduit 13 by a major part of the minor portion of the gas stream to be treated to the tray assembly 4. As can be seen more fully in FIGS. 2, 3, and 4, the gas-liquid contact tray assembly 4 includes a peripheral border frame 26 which is adapted to be fixed along the edges thereof to the inner walls of housing 1. A plurality of longitudinally extending slats 27 having integral end rod tips 28 are pivotally mounted to frame 26 in side-by-side relation by means of brackets 29 which receive rod tips 28. With this arrangement, slats 27 can pivot about their rod tip axis from a position transverse the gas flow path during low-volume gas flow operations to a substantially vertical position parallel the gas flow path during high-volume gas flow operations.

As can be seen in FIGS. 5, slats 27 can be provided with a plurality of apertures 31 therein to reduce flutter during low gas flow operations. Further, as can be seen in FIG. 6, slats 27, which advantageously are of symmetrical configuration, can be provided with a plurality of notches 32 along the facing edges thereof, the symmetrical configuration permitting ready aperture formation by the notches of adjacent slats upon assembly in mirror image relation.

In a typical operation of the aforedescribed apparatus during low gas volume operations, a major portion of the dirty-gas stream to be treated enters through dirty-gas inlet 2 of housing 1 and passes through the spaces between slats 27, entraining liquid which has been lifted to the tray by a minor portion of the dirty-gas stream cooperating with the meeting conduits 13 and 14, the relatively horizontal position of slats 27 during low-volume gas-treating operations serving to create the pressure differential on opposite sides of tray 4 to effect the liquid lift. During high gas flow operations, the major portion of the gas stream causes slats 27 to be pivoted into vertical position, thus lowering the resistance offered by slats 27.

I claim:

1. A gas-scrubbing apparatus comprising: a flow-through gas housing having a dirty-gas inlet means and a clean gas outlet means, said housing defining a gas flow path for the total flow of gas to be treated; gas filter means disposed in said housing transverse said gas flow path; a gas-liquid contact tray disposed in said housing below said gas filter means and transverse said gas flow path, said gas-liquid contact tray including a plurality of side-by-side longitudinally extending slats pivotally mounted in said housing to pivot from a substantially horizontal position transverse and in substantial covering relation with said gas flow path during low-volume gas flow operations to a substantially vertical full open position parallel said gas flow path during high-volume gas flow operation, said slats having a plurality of apertures therein which extend transverse the gas flow path when said slats are in horizontally closed position to permit the gas being treated to a flow uninterruptedly therethrough to reduce flutter, a liquid sump containing a supply of liquid to be conveyed to said housing; and means to move said liquid from said sump to said gas-liquid contact tray during low-volume gas flow operations.

2. The apparatus of claim 1 and means to move said liquid from said sump to said gas filter means during high-volume gas flow operations.

3. The apparatus of claim 1, said slats being of symmetrical configuration with a plurality of apertures therein along the facing edges thereof.

4. The apparatus of claim 1, said dirty-gas inlet means having a relatively large gas-admitting area for admitting a first and major portion of said total gas flow directly to said housing; said means to move said liquid from said sump including a conduit means of substantially smaller cross-sectional area relative to the cross-sectional area of said housing, said conduit extending from said sump to said gas-liquid contact tray to define a separate, confined path for the flow of a second and minor portion of said total gas flow with liquid in particulate form entrained therein, said conduit means including means for admitting liquid from said sump into its lower portion; first conduit gas inlet means for admitting a minor part of said second portion of gas flow into said conduit means adjacent the level of liquid in said conduit means, and second conduit gas inlet means spaced from said first conduit gas inlet means for admitting the major part of said second portion of gas flow into said conduit means, the gas-admitting area of said conduit means being sufficiently small relative to said gas-admitting area of said chamber to constrain said total gas flow to divide into said major and minor portions.